Dec. 22, 1959 H. E. HOLLMANN 2,918,573

PASSIVE SELF-POWERED TRANSISTOR DETECTOR-AMPLIFIER

Filed Sept. 10, 1956

INVENTOR
HANS ERICH HOLLMANN
BY [signature]
ATTORNEY

United States Patent Office 2,918,573
Patented Dec. 22, 1959

2,918,573

PASSIVE SELF-POWERED TRANSISTOR DETECTOR-AMPLIFIER

Hans E. Hollmann, Studio City, Calif., assignor to Dresser Industries, Inc., Dallas, Tex., a corporation of Delaware Application September 10, 1956, Serial No. 608,863

7 Claims. (Cl. 250—20)

The present invention relates to means for and a method of detecting or demodulating radio frequency carrier signals modulated by a modulating signal of a lower frequency, more particularly to an improved passive detector utilizing a semiconductive translating device, known as a transistor, as a demodulating or detecting and/or amplifying element of the audio or other low frequency component of a modulated high frequency signal without requiring any local power source for its operation.

A principal object of the invention is to substantially improve the efficiency of detection of a passive detector or demodulator of this type, that is, to increase the amount of demodulator output power of the detector in relation to the total input energy contained in a received modulated signal wave.

Considering the reception of a powerful radio transmitter, such as a local broadcasting station, by means of a conventional crystal rectifier or detector constituting the simplest known form of passive detector or detector requiring no local power for its operation, the incoming carrier wave energy is received continuously even though it has no modulating signal (telegraph, audio, picture, etc. signal) impressed thereon. In the latter case, the rectification of the carrier wave by the detector produces a D.C. (direct current) output voltage determined by the carrier amplitude. The resultant D.C. energy is dissipated in the associated load circuit, such as in the audio transformer, loudspeaker, earphones, etc. As soon as modulation occurs, an A.C. (alternating current) or modulating signal output voltage is impressed upon the D.C. voltage as a result of the rectification of the modulation envelope of the carrier wave, the D.C. energy component resulting from the rectification of the carrier being again lost and dissipated in the same manner as when receiving a non-modulated signal wave or carrier.

A further object of the invention is, therefore, the provision of simple and efficient detecting means and an operative circuit therefor, whereby to utilize the D.C. energy resulting from the rectified carrier component of a modulated signal wave, or, in other words, to amplify or intensify the demodulated output energy without the use of an additional power source.

Another object of the invention is the utilization, in a radio receiver, of the rectified carrier energy of a modulated high frequency signal wave to effect a power detection or demodulation of the low frequency or modulating signal impressed upon said wave at the transmitter.

The invention, as to its further objects as well as novel aspects, will be better understood from the following detailed description taken in reference to the accompanying drawing forming part of this specification and wherein.

Like reference characters identify like parts in the different views of the drawing.

Figure 1:
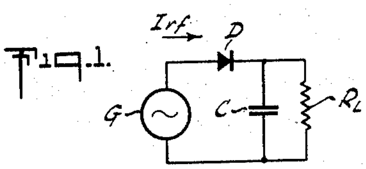
Fig. 1 is a simple conventional passive detector circuit utilizing a crystal rectifier or diode and shown to afford a better understanding of the improvements of the invention.

The essence and underlying basic principle of the invention will be better understood by reference to Fig. 1 of the drawing and to the following discussion and analysis of the respective carrier and modulating signal components contained in a modulated carrier wave.

In the circuit shown in Fig. 1, a generator G supplies a modulated high frequency carrier current to a crystal detector or diode D and a load resistance $R_L$ shunted by a filter or smoothing capacitor C connected in the conventional and well known manner. The detector is assumed to operate in ideal fashion, that is, the RF voltage supplied by the generator G has a sufficient amplitude and the diode impedance is assumed to be relatively small compared with the load impedance $R_L$. In other words, the A.C./D.C. impedance ratio of the load approaches unity and the bypass capacitor C forms a short circuit for the RF currents, while offering an appreciable impedance to the AF or other modulation current.

Under these conditions, the generator drives a current $$I_{rf}=I_c+I_m \cos \omega t=I_c(1+M \cos \omega t) \qquad (1)$$

through the circuit, wherein $I_c$ is the carrier amplitude, $I_m$ the modulation component amplitude, and $M=I_m/I_c$ the degree of modulation. With $M=0$, that is for a non-modulated carrier, the D.C. energy or power $P_c$ dissipated in the load is represented by the following equation:

$$P_c=I_c^2R_L \qquad (2)$$

In case of modulation, the resultant AF energy is represented as follows:

$$P_m=\frac{I_m^2}{2}R_L \qquad (3)$$

From the above it follows that the ratio between the D.C. and A.C. power outputs is as follows:

$$P_c/P_m=2/M^2 \qquad (4)$$

Thus, in the case of a 30% modulation the maximum theoretical D.C. energy available from a crystal detector receiver exceeds the A.C. energy about 20 times. As the degree of modulation M increases, the power ratio decreases and for M equal to unity the ratio approaches the value of two, if the effect of "carrier level shift" is neglected. Since modern broadcasting stations operate with a peak modulation of only about 30%, there is available sufficient D.C. energy resulting from the rectification of the carrier for use as a means or power source to amplify or intensify the modulation signals, and, in turn, to produce an increased AF output of a passive detector, by means of an improved type of transistor circuit in accordance with the basic underlying principle and object of the invention.

The order of magnitude of the energy available under normal conditions is further indicated by the following. Assuming a broadcast transmitter to have a transmitted or radiated power output $T_r$ and assuming further the station to be located at a distance D from the receiver, then a vertical wire antenna having a length $l$ and energizing a crystal detector produces D.C. energy of a magnitude represented approximately by the following formula:

$$P_{dc}=50T_r\ (l/D)\ \text{microwatts}$$

wherein D is in kilometers, $l$ in meters and $T_r$ in kilowatts. As an example, a broadcast transmitter radiating 25 kilowatts and located at a distance of 5 km. produces in an antenna wire having a length of ten meters approximately 5 milliwatts, that is a power sufficient to operate a small loudspeaker or to power a transistor amplifier. Amplification or intensification at such low power level can be efficiently effected by means of semi-conductive translating devices or transistors as known in the art.

Figure 2:
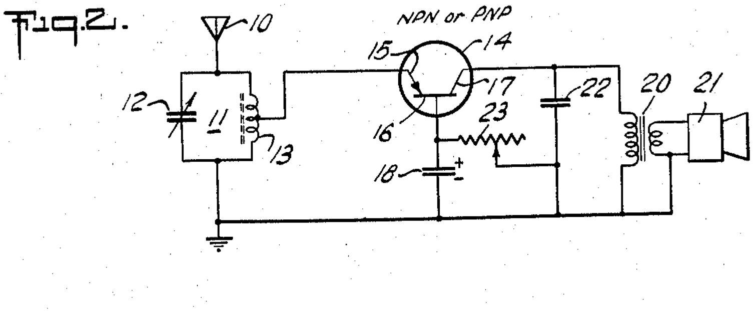
Fig. 2 shows one form of an improved passive detector circuit utilizing a transistor as a detector element and embodying the principles of the invention.

A simple passive "power" receiver of this type embodying the present invention is shown in Fig. 2. In the latter, modulated radio signals radiated or otherwise transmitted by a distant transmitting station are received or intercepted by an antenna 10 connected in a conventional manner to a tuned circuit 11 comprised of a variable capacitor 12 shunted by an induction coil 13. In place of a crystal detector or diode, the invention in the embodiment shown utilizes a transistor 14, such as a junction transistor, as a detecting and amplifying means, said transistor comprising in a known manner at least an emitter 15, a base 16 and a collector 17. The transistor may be either of the NPN or PNP conductivity type without altering the function and results, as will become apparent from the following.

The emitter-base junction of the transistor 14 is coupled with the tuned circuit 11 in series with a relatively large capacitor 18 connected between the base 16 of the transistor and the low potential side of the circuit 11, the emitter 15 being connected to a suitable tap point on the inductance 13 of the tuned circuit, to properly match the emitter circuit with the signal input circuit 11. As a result, the emitter-base diode charges the capacitor 18 and thus not only produces the supply voltage for the collector 17, but, at the same time performs the signal detection by impressing the modulating signals upon the collector 17. The transistor may be considered to operate in common base connection, producing its own supply of energy for the collector as well as the input signals.

Connected in the collector circuit is a transformer 20 for applying the demodulated signal current to a translating device, such as a loudspeaker 21 in the example shown in the drawing. Item 22 is a bypass capacitor for the RF currents in the collector circuit, while numeral 23 denotes a base leak or return resistor, to permit of proper adjustment of the energy level of the transistor and to effect matching of the transistor load with the RF input or receiving circuit.

The filter capacitor 18 should be of a sufficient size or capacity so as to bypass both the RF and AF components of the received modulated wave, whereby to impress a steady D.C. operating voltage of proper polarity upon the collector 17, as seen further from the following. Assuming the use of a PNP conductivity type junction transistor, the positive half waves of the impressed carrier signals will be passed by the emitter-base junction acting as a diode, whereby to charge the upper plate of the capacitor 18 positive and to charge the lower plate of the capacitor negative, as indicated in the drawing. As a result collector operating voltage of proper polarity is provided, that is, the collector 17 is biased negatively in respect to the base 16, as required for a PNP type transistor. In the case of a NPN conductivity type transistor, all the polarities are reversed so that the collector 17 will be biased positively in respect to the base 16, in a manner readily understood from the foregoing.

In a transistor detector or "transector" of this type, the A.C. or modulation component provides the input signal for the transistor, whereby to result in detection and amplification in the collector or output circuit as a result of the basic transistor action. The audio or other demodulated output signal developed in the collector circuit may be utilized in any suitable manner to operate a loudspeaker or equivalent output device. Any RF component which has been transmitted to the collector circuit is bypassed by the capacitor 22 in parallel to the input of winding the audio or output transformer 20.

The function of and novel effects obtained by the invention will be further understood from the following.

Assuming an unmodulated carrier being received by the antenna 10 and tuned circuit 11, the positive half waves of the carrier derived from the inductance 13 are passed by the emitter-base junction of the transistor 14, assumed to be of the PNP type, that is, the half waves for which the bias is in the forward or current-passing direction, in such a manner as to build up a DC voltage across the capacitor 18 by rectifying action of the emitter-base junction of the transistor with the collector-base junction acting as load of the rectifier. Little current, except for the reverse collector current will pass through the collector-base junction which is biased in the reverse or current blocking direction by the D.C. voltage developed across the capacitor 18, in the manner described hereinabove.

If now the received carrier is amplitude-moduated in accordance with an audio or the like modulating signal, the resultant low frequency or audio component will be passed to the collector due to the inherent function of the transistor, except for a relatively small component through the base leak 23. As a result, audio signals of increased power are developed in the collector circuit by power rectification and/or amplification, the demodulated output energy being sufficient in many cases to directly operate the loudspeaker 21 or equivalent translating device without additional audio amplification. Considered in a different manner, the transistor functions as a means to segregate the AF component from the RF component of the received modulated wave, that is, in other words, the function of a detector or demodulator, while at the same time utilizing the resultant and normally wasted rectified RF power to intensify the detected audio signals. The transistor thus assumes in whole or in part the function of the usual filter serving as a means for segregating the RF and AF components, respectively.

There is thus provided by the invention a simple and efficient detector for modulated carrier signals utilizing the normally lost energy of the carrier for "power" detection to result in a maximum demodulated signal or output, without the use of any local power source. The function of such a passive power detector or receiver according to the invention can furthermore be considered as equivalent to an intensification of the degree of modulation M of the received wave, that is, a shift of the total energy from the carrier to the modulating signal. In other words, the transistor functions both as a detector and M-intensifier by utilizing the unmodulated or carrier power as a source of energy to effect the intensification or amplification of the demodulated signals.

The bypass capacitor 22 in the collector circuit is vital for the separation of the RF and AF currents or signals, to enable the transistor to operate as an audio amplifier. Without the capacitor 22, the transistor is overcontrolled and would operate inefficiently and result in considerable distortion.

A transistor amplifier operated at a supply level of a few milliwatts available from a standard broadcast transmitter does not operate at maximum efficiency, although the audio output in the case of the invention is increased considerably compared with a simple crystal detector. As a class-A amplifier, the energy conversion may be in the order of about 25%. As a result, upon comparing the output level of a standard crystal receiver with a "power" detector according to the invention, the resultant ratio of the D.C. power to the A.C. power according to Equation 4 must be divided by 4. The result, in such a case, is that a passive "power" detector according to the invention still produces ½ $M^2$ more output energy than a standard crystal receiver, assuming both to receive the same transmitting station and to energize the same loudspeaker or equivalent output device. Measurements have shown that the transistor detector provides about ten times the signal amplitude energizing the same loudspeaker, that is, about three times the energy obtainable from a properly matched crystal diode receiver.

An advantage of the circuit of Fig. 2 is the fact that either NPN or a PNP conductivity type transistor may be used without affecting the function and the results obtained by the invention. This is due to the fact that the polarity of the D.C. voltage developed across the capacitor 18 adjusts itself automatically for either type of transistor, in a manner described and understood from the foregoing.

While a transistor detector or "transector" according to Fig. 2 results in an increased demodulated output compared with a conventional crystal receiver, the combined functions of the transistor, first, as its own power rectifier by converting the RF energy into D.C. energy, second, as a detector for the modulating signals and, third, as an audio amplifier, make it difficult to obtain allover optimum efficiency, whereby for practical purposes, the output always remains below the theoretical level.

Figure 3:
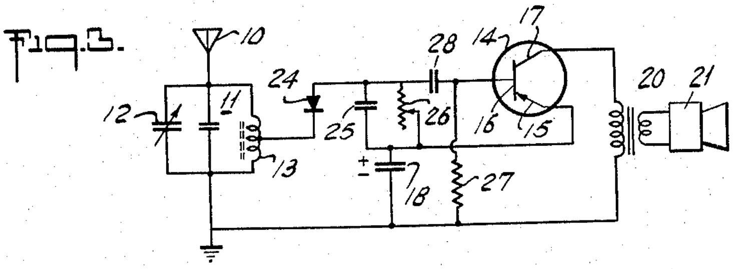
Figs. 3 and 4 show modifications of a passive "power" detector constructed in accordance with the invention.

According to a modification of the invention as shown in Fig. 3, the rectified A.C. and D.C. component are produced by means of a separate diode detector 24 and individually applied to the transistor 14 as input signal and collector biasing voltage, respectiveley, for efficient and optimum amplification of the demodulated signals by the transistor. For this purpose, a crystal diode 24 is connected to the induction coil 13 in series with a first filter capacitor 25 designed to bypass the RF followed by the capacitor 18 designed to bypass both RF and AF, in the manner similar as described in connection with Fig. 2. Capacitor 18, thus develops the D.C. operating voltage for the collector 17 in the same manner as in Fig. 2, while the separately developed signal or audio voltage occurs across the capacitor 25, furthermore shunted by a load resistor 26, and is separately and independently applied to the base 16 and the emitter 15 of the transistor by way of a further coupling capacitor 28 and base leak resistor 27.

The transistor may accordingly be designed and operated independently of the carrier and modulation signal detection, to act as an efficient amplifier for the audio signals produced by separate diode rectification. In other words, the functions of the control of the transistor, on the one hand, which in this case is operated in common emitter connection, and the production of the D.C. collector voltage by rectification of the carrier component, on the other hand, are independent and separate from one another, whereby the transistor may be designed and/or operated in a manner to insure optimum amplification with a minimum of distortion of the audio or other modulating signals.

Figure 4:
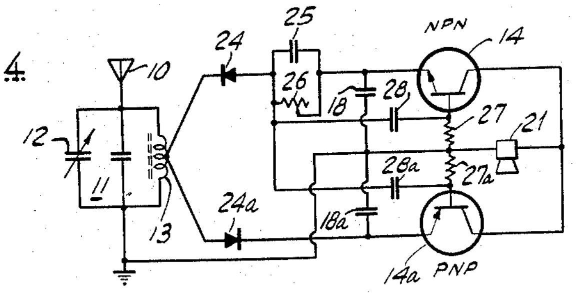

Referring to Fig. 4 this shows a circuit of the type of Fig. 3 in the form of a push-pull amplifier utilizing a pair of transistors 14 and 14*a* of different conductivity type, that is NPN and PNP, respectively. In order to develop collector bias voltages of opposite polarity by the respective filter capacitors 18 and 18*a*, the corresponding crystal diodes 24 and **24*a* are connected in relative opposite sense to the inductance 13. Furthermore, the audio signal voltage is developed by one of the diodes only, that is diode 24 in the example shown, to control both transistors by way of coupling capacitors 28 and 28*a* and base leak resistors 27 and 27*a*, respectively. An advantage of this circuit is the fact that the loudspeaker 21** or equivalent output device may be directly connected in the common return lead of the collectors of the transistors, thus dispensing with a special push-pull transformer.

While the improved transistor detector according to the invention is especially suitable for the passive reception of a powerful radio station, such as a local broadcast transmitter, for directly operating a loudspeaker or the like, a passive "power" detector or "transector" according to the invention has numerous other uses and applications where a simple and efficient detection or demodulation of a radio signal is required. As an example, the invention may advantageously be used as a second detector stage of a superheterodyne radio receiver, whereby the D.C. voltage developed by the detector may be advantageously used for effecting an automatic volume control (AVC) without the use of special filters or other auxiliary devices to separate the AVC signal from the audio or other demodulated signals.

Figure 5:
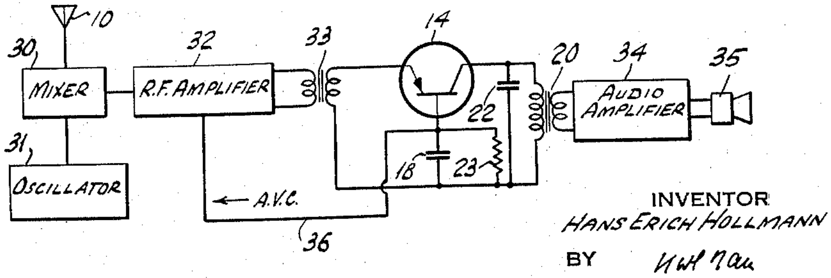
Fig. 5 illustrates, by way of example, a complete superheterodyne radio receiver, shown in diagram form and embodying a passive detector combined with automatic volume control (AVC) means according to the invention as a second detector of the receiver.

A receiver of this type is diagrammatically shown in Fig. 5 of the drawing. The received radio signals are applied from the antenna 10 to a frequency changer or mixer stage 30 to be combined with a local oscillation generated by an oscillator 31 to produce modulated intermediate frequency signals having a fixed frequency (IF) in a manner well known. The IF signals are efficiently amplified by an IF amplifier 32 and the amplified output signals applied to a transistor detector of the type according to Fig. 2 shown in the example illustrated. The D.C. voltage developed across the filter capacitor 18, in addition to serving as collector biasing voltage of the transistor 14, is furthermore impressed upon the control electrodes of one or more stages of the IF amplifier 32 through a conductor 36, to provide automatic volume control (AVC) in a manner well known by those skilled in the art. The demodulated output signals, in the example shown, are applied to an audio amplifier for further amplification prior to energizing a loudspeaker 35. In many cases, where a limited output is sufficient, the amplifier 34 may be dispensed with, resulting in a simplification and reduction of costs of the receiver.

In using a "power" detector of this type as second detector of a superheterodyne receiver, the emitter diode produces the collector supply voltage as well as the AVC voltage in the manner described, while the collector diode produces the demodulated audio voltage. Instead of requiring a complicated RC network or filter, both voltages with different time constants are separated by the emitter and collector junctions of the transistor.

The utilization of the rectified IF carrier of the receiver to intensify the audio signal output in a superheterodyne receiver has been found by experiments to provide sufficient output energy for operating a small loudspeaker directly by the transistor detector or "transector" without additional audio amplification.

In the foregoing the invention has been described with reference to a specific illustrative device and circuit. It will be evident, however, that numerous modifications and variations, as well as the substitution of known elements for those shown and described, may be made without departing from the broader scope and spirit of the invention as set forth in the appended claims. The specification and drawing are accordingly to be regarded in an illustrative rather than in a limiting sense.

I claim:

1. A passive detector for demodulating radio frequency carrier signals modulated by a relatively lower frequency modulating signal comprising a transistor having an emitter, a base and a collector, a storage capacitor having one electrode connected to said base, means to directly apply a modulated carrier signal to be detected to said emitter and to the remaining electrode of said capacitor, said capacitor designed to cause a constant direct voltage to be developed thereacross by rectification of the carrier component by said emitter, and means to utilize that said direct voltage to power said collector, to develop an intensified demodulated output signal by rectifying action of said collector.

2. A passive detector for demodulating radio frequency carrier signals modulated by a relatively lower frequency modulating signal comprising an input circuit, a transistor having an emitter, a base and a collector, a capacitor having one electrode connected to said base, means directly connecting said input circuit to said emitter and to the remaining electrode of said capacitor, and a modulation signal output circuit connected to said collector and said last-named electrode of said capacitor.

3. A passive detector as claimed in claim 2 including a base leak resistor connected across said capacitor.

4. A passive detector as claimed in claim 3 including a signal translating device in said output circuit and a radio frequency bypass capacitor shunting said device.

5. In a radio receiver including a radio frequency amplifier and a passive detector connected thereto, said detector comprising a transistor having an emitter, a base and a collector, a capacitor having one electrode connected to said base, means to apply modulated radio frequency energy from said amplifier to said emitter and to the oposite electrode of said capacitor, to develop a rectified carrier voltage across said capacitor, means to power said collector by said rectified voltage to develop demodulated output signals in the collector circuit of said transistor, and further means to apply voltage from said capacitor to said amplifier to effect automatic volume control of said amplifier.

6. In a superheterodyne radio receiver including a radio frequency and an intermediate amplifier, a passive detector connected to said intermediate frequency amplifier, said detector comprising a transistor having an emitter, a base and a collector, a capacitor having an electrode submitted to said base, means to apply energy from said intermediate frequency amplifier to said emitter and the opposite electrode of said capacitor, to develop a rectified carrier voltage across said capacitor, means to power said collector by said rectified voltage, to develop demodulated output signals in the collector circuit of said transistor, and further means to apply voltage from said capacitor to at least one of said amplifiers to effect automatic volume control thereof.

7. A passive detector comprising: a transistor having at least an emitter, a base, and a collector; a storage capacitor connected between said base and a common point of reference potential; means to apply a modulated carrier signal directly between said emitter and said point; and a load connected between said collector and said point, whereby said transistor simultaneously performs three functions, namely, (1) signal detection, (2) power rectification of the incoming carrier, and (3) signal amplification.

References Cited in the file of this patent

UNITED STATES PATENTS

| | | |
|---|---|---|
| 2,486,776 | Barney | Nov. 1, 1949 |
| 2,777,057 | Pankove | Jan. 8, 1957 |